United States Patent Office 3,824,242
Patented July 16, 1974

3,824,242
SYNTHESIS OF MEPERIDINE
Robert Levine and Vance Bell, Pittsburgh, Pa., assignors to Research Corporation, New York, N.Y.
No Drawing. Filed Jan. 26, 1973, Ser. No. 326,641
Int. Cl. C07d 31/36
U.S. Cl. 260—295 R        7 Claims

ABSTRACT OF THE DISCLOSURE

There is provided a method of synthesis of the analgesic meperidine, otherwise known as 1-methyl-4-phenyl-4-carbethoxypiperidine which comprises sequentially treating 1-methyl-4-phenyl-1,2,3,6-tetrahydropyridine with a lithiumalkyl and an ethyl haloformate or diethyl carbonate to yield 1 - methyl-4-phenyl-4-carbethoxy-1,2,3,4-tetrahydropyridine which is reduced by catalytic hydrogenation to yield the desired meperidine.

FIELD OF THE INVENTION

Synthesis of meperidine.

DESCRIPTION OF THE PRIOR ART

Meperidine, otherwise known as Demerol is a well known and well established analgesic. Several syntheses of this compound are known. However, only two are considered to be of commercial importance.

The original synthesis (U.S. Pat. 2,167,351) involves the condensation of phenyl acetonitrile with $\beta,\beta'$-dichlorodiethylmethylamine in the presence of sodium amide to give Demerol nitrile which is hydrolyzed and subsequently esterified to give meperidine. The basic problem with this synthesis is its utilization of $\beta,\beta'$-dichlorodiethylmethylamine, otherwise known as nitrogen mustard which is a highly volatile vesicant. The use of this compound apparently gave rise to such problems of industrial production that an alternative method was developed by I. G. Farbenindustrie (B.I.O.S. Final Report No. 766; Item Nos. 22 and 24, pages 60 through 66). This synthesis, which is a 6-step synthesis involves the use of $\beta,\beta'$-dichlorodiethylbenzylamine an analog of nitrogen mustard which although also a vesicant is not so volatile as nitrogen mustard itself and not so serious a vesicant. Nevertheless, it would be desirable to provide a method which does not use any vesicants whatsoever, involves the use of inexpensive chemicals, and fewer steps than that involved in the present commercial route, i.e. the I.G. Farbenindustrie route, described hereinabove.

The method of the present invention depends upon the metalation of 1 - methyl-4-phenyl-1,2,3,6-tetrahydropyridine which is a known compound (Hartough et al., U.S. Pat. 2,647,115) at the 4 position and the subsequent trapping of the thus produced carbanion with an ethyl haloformate. While the trapping of carbanions by ethyl haloformates or diethyl carbonate is known, the formation of the carbanion, and more particularly, the effective location of the negative charge on the carbanion is not predictable. For example, the treatment of alkenes either conjugated with one other double bond or conjugated with an aromatic system yields, depending on the circumstances either 1,2 or 1,4 or 1,2 with 1,4 addition but not metalation. Treatment of pyridine with organolithium compounds leads to 1,2 addition followed by 1,2 elimination.

SUMMARY OF THE INVENTION

In the process of the present invention 1-methyl-4-phenyl - 1,2,3,6 - tetrahydropyridine (I) which may be readily prepared by the reaction of $\alpha$-methylstyrene, aqueous formaldehyde and methylamine hydrochloride is treated with a lithiumalkyl or aryl of up to 10 carbon atoms, suitably a lithiumalkyl (II) in a nonhydroxylic solvent, suitably an ether, to yield the carbanion (III) which is not isolated but treated with an ethyl haloformate (IV) or diethyl carbonate (V) to yield 1-methyl-4-phenyl-4-carbethoxy-1,2,3,4-tetrahydropyridine (VI). This compound is then isolated and reduced, suitably by catalytic hydrogenation to yield meperidine (VII).

DESCRIPTION OF THE PREFERRED EMBODIMENTS

In the process of the present invention there is used as starting material the known compound 1-methyl-4-phenyl-1,2,3,6-tetrahydropyridine which may be readily produced by the method of Schmidle and Mansfield, J. Am. Chem. Soc., 78, 425 (1956) or Hartough, U.S. Patent 2,647,117. The starting material is then taken up in a suitable solvent preferably an ethereal solvent such as diethyl ether or tetrahydrofuran, the latter being preferred. The solution is then treated with a lithiumalkyl or a lithiumaryl. Any lithiumalkyl may be used, suitably a lithiumalkyl continuing from 1 to 5 carbon atoms in the alkyl moiety, most preferably n-butyllithium is employed since this material is readily available and may be handled with relative ease. Among the lithiumaryls, lithiumphenyl may also be employed, however, this is not a reagent of choice since the yields obtained utilizing lithiumphenyl are not as good as those obtained utilizing lithiumalkyls, such as n-butyllithium. It is important that the reaction be carried out utilizing anhydrous reagents in an atmosphere from which moisture is excluded. It is especially preferred to operate under an atmosphere of dry nitrogen. The reaction may be carried out under ambient temperature and pressure. These latter factors however are not critical to the success of the reaction. In view of the subsequent step of this reaction it is preferred to utilize equivalent amounts of the starting material and the lithiumalkyl. The use of a small excess of lithiumbutyl, say about 10% excess, may be desirable. Even though the use of excess lithiumalkyl will lead to a corresponding wasteage of the ethyl haloformate in the next step the use of a small excess will ensure complete reaction of the starting material which is slightly more costly than the ethyl haloformate.

The carbanion (III) is formed virtually instantaneously and the reaction mixture is then added to an ethyl haloformate such as ethyl chloroformate or ethyl bromoformate, the former being preferred. There is utilized in this step one equivalent of the ethyl haloformate per equivalent of alkyllithium charged. Thus, if an excess of alkyllithium is utilized the appropriate excess of ethyl haloformate should be added. Similarly, diethyl carbonate (V) may be employed in place of the ethyl haloformate.

The reaction mixture is then worked up to isolate the 1 - methyl - 4 - phenyl - 4 - carbethoxy - 1,2,3,4 - tetrahydropyridine (VI). Suitably in this work up, the reaction mixture is quenched by the addition of aqueous saline caustic soda, ether is added, the organic layer separated therefrom and the aqueous layer extracted several times with ether. Evaporation of the combined organic phase, suitably under reduced pressure, on a water bath, yields the desired product (VI) which may then, if desired, be further purified by distillation under reduced pressure.

Product (VI) is then reduced to meperidine by hydrogenation. The hydrogenation is suitably carried out in the presence of a catalyst such as platinum, platinum oxide, palladium on a suitable carrier such as charcoal or calcium carbonate or in the presence of Raney nickel. The conditions of temperature and pressure are not critical. However, it has been found especially desirable to utilize palladium on charcoal as a catalyst at elevated pressures, suitably from about 10 to about 100, most preferably about 30 to about 60 p.s.i. at substantially ambient temperatures in a Parr bomb. The course of the hydrogenation is observed by the fall in pressure in the vessel in the usual manner. After uptake of one molecule equivalent of hydrogen per molecule of product (VI) the reaction mixture is worked up to isolate the meperidine. After separation of the product from the catalyst, suitably by filtration, the reaction product is further purified by distillation under reduced pressure.

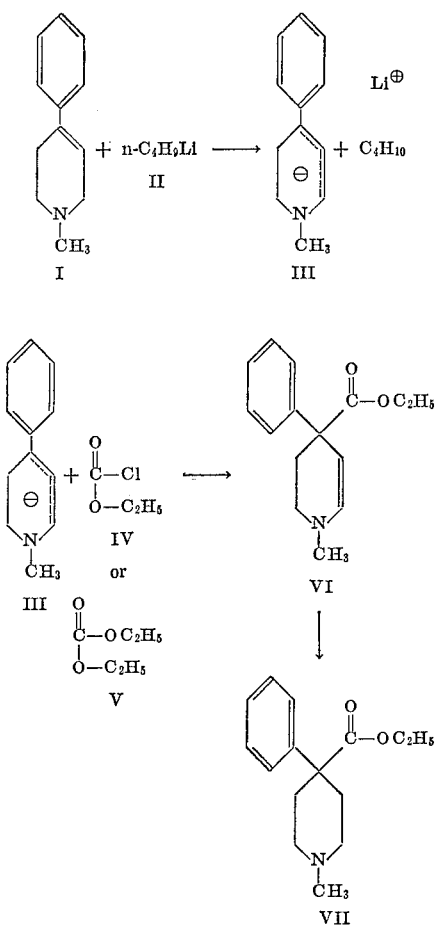

Example I

1-Methyl-4-phenyl-1,2,3,6-tetrahydropyridine (8.65 g., 0.05 mole) is charged to a dry vessel containing a continuous flow of dry nitrogen, and dry tetrahydrofuran (150 ml.) is added thereto. n-Butyllithium (31.25 ml. of 15.02% solution in hexane, 0.05 mole) is added thereto at a dropwise rate while the solution of the methylphenyltetrahydropyridine is stirred. The reaction mixture acquires a red color which deepens with further addition of the n-butyllithium. Effervescence due to the evolution of butane is noted.

Shortly after the addition is complete the mixture is added to a solution of ethyl chloroformate (6.51 g., 0.06 mole) in tetrahydrofuran (30 ml.) which is cooled in an ice bath to circa 0° C. Addition is complete in about 2 minutes. The mixture is stirred for a further minute and then quenched with saline sodium hydroxide (water 100 ml., sodium chloride 13 g., sodium hydroxide 4.0 g.), and stirred for one minute. Ether (300 ml.) is added and the mixture agitated for a further 4 minutes.

The organic layer is separated and retained and the aqueous layer further extracted with ether (2× 125 ml.). The organic extracts are combined, dried over sodium sulphate, filtered, and the filtrate stripped of solvent to yield a thick residue which, upon distillation under reduced pressure, yield 1-methyl-4-phenyl-4-carbethoxy-1,2,3,4- tetrahydropyridine (4.35 g., 35.5%, b.p. 135–140°/0.9 mm.). NMR(CCl$_4$) 1.37$\delta$ triplet (J=7 H$_z$), 2.74$\delta$ multiplet, 4.28$\delta$ quartet (J=7H$_z$), 4.83$\delta$ doublet (J=8H$_z$), 6.20$\delta$ doublet (J=8H$_z$), 7.42$\delta$ multiple. IR (film) (listed in decreasing intensity) 1724 cm.$^{-1}$, 1248 cm.$^{-1}$, 1640 cm.$^{-1}$, 697 cm.$^{-1}$, 1203 cm.$^{-1}$. G.C.-M.S. (listed in decreasing intensity) 70 ev., base 172, 42, 91, 115, 245, 128, 85.5, 94.

In accordance with the foregoing procedure but where, in place of n-butyllithium there is utilized phenyllithium, methyllithium, sec-butyllithium or amyllithium, the same product is obtained.

In accordance with the foregoing procedure but where in place of ethyl chloroformate there is utilized ethyl bromoformate or diethyl carbonate, the same product is obtained.

Example II

The purified 1-methyl-4-phenyl-4-carbethoxy-1,2,3,4-tetrahydropyridine (2.45 g., 0.01 mole) produced in accordance with Example I is taken up in 35 ml. of ethanol, palladium on charcoal (1 g., 5%) is added thereto and the mixture agitated for one hour under an initial charge of 50 p.s.i. of hydrogen. The excess hydrogen pressure is released, the reaction mixture filtered to remove the catalyst, the solvent removed under reduced pressure and the residue distilled under reduced pressure to yield 1-methyl-4-phenyl-4-carbethoxypiperidine. B.p. 113–116°/0.25 mm. (lit. b.p.. 147°/ C./3 mm.).

Alternatively, dry hydrogen chloride gas is passed through the filtrate from the hydrogenation, the precipitate separated by filtration and recrystallized from ethanol to yield meperidine hydrochloride, m.p. 186–189° C.

Example III

The crude reaction mixture of Example I is reduced in volume to about 200 ml., palladium on charcoal (10 g., 5%) is added thereto and the mixture charged to a Parr shaker having an initial charge of hydrogen at 50 lbs. per square inch. The mixture is agitated for about 1 hour, the excess hydrogen removed, the mixture filtered to remove the catalyst and the solvents removed by distillation under reduced pressure. The product is then purified in acordance with the procedure of Example II.

We claim:
1. In a process for the synthesis of 1-methyl-4-phenyl-4-carbethoxypiperidine the steps of:
(a) reacting

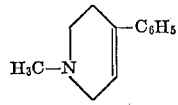

with RLi wherein R is lower alkyl or aryl of up to 10 carbon atoms,
(b) reacting the mixture of step (a) with

where Q is halo or ethoxy
to form 1-methyl-4-phenyl-4-carbethoxy - 1,2,3,4 - tetrahydropyridine.
2. A process according to Claim 1 wherein RLi is a lithiumalkyl containing 1–5 carbon atoms in the alkyl moiety.
3. A process according to Claim 2 wherein the lithiumalkyl is lithium n-butyl.

4. A process according to Claim 1 wherein Q is chloro.
5. A process according to Claim 3 wherein Q is chloro.
6. A process according to Claim 2 wherein Q is ethoxy.
7. A process according to Claim 3 wherein Q is ethoxy.

References Cited

UNITED STATES PATENTS 2,636,881  4/1953  Schultz _____ 260—293.72

OTHER REFERENCES

Lewis et al., J. Chem. Soc., London, Part C, pp. 1074–76 (1970).

ALAN L. ROTMAN, Primary Examiner

U.S. Cl. X.R.

260—290 R; 293.72; 424—266, 267